J. L. FOISTER.
VALVE.
APPLICATION FILED JUNE 7, 1919.

1,339,750.

Patented May 11, 1920.

Inventor
J.L. Foister.

Witness

By C.A. Snow & Co.
Attorneys

UNITED STATES PATENT OFFICE.

JOHN L. FOISTER, OF CHAPEL HILL, NORTH CAROLINA, ASSIGNOR OF ONE-HALF TO WILLIAM S. ROBERSON, OF CHAPEL HILL, NORTH CAROLINA.

VALVE.

1,339,750.  Specification of Letters Patent.  Patented May 11, 1920.

Application filed June 7, 1919. Serial No. 302,419.

*To all whom it may concern:*

Be it known that I, JOHN L. FOISTER, a citizen of the United States, residing at Chapel Hill, in the county of Orange and State of North Carolina, have invented a new and useful Valve, of which the following is a specification.

This invention relates to a supply valve for use primarily in connection with flush tanks and the like, one of its objects being to provide a simple and efficient valve which can be taken apart readily without the use of special tools or the like, and which valve will be moved to its seat by a float and held in such position by the pressure of water thereagainst until the valve is shifted away from its seat.

Another object is to provide a valve which can be used in a flush tank without necessitating any changes in the mechanism therein.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention as set forth in the appended claims.

In the accompanying drawings the preferred form of the invention has been shown.

In said drawings—

Figure 1:
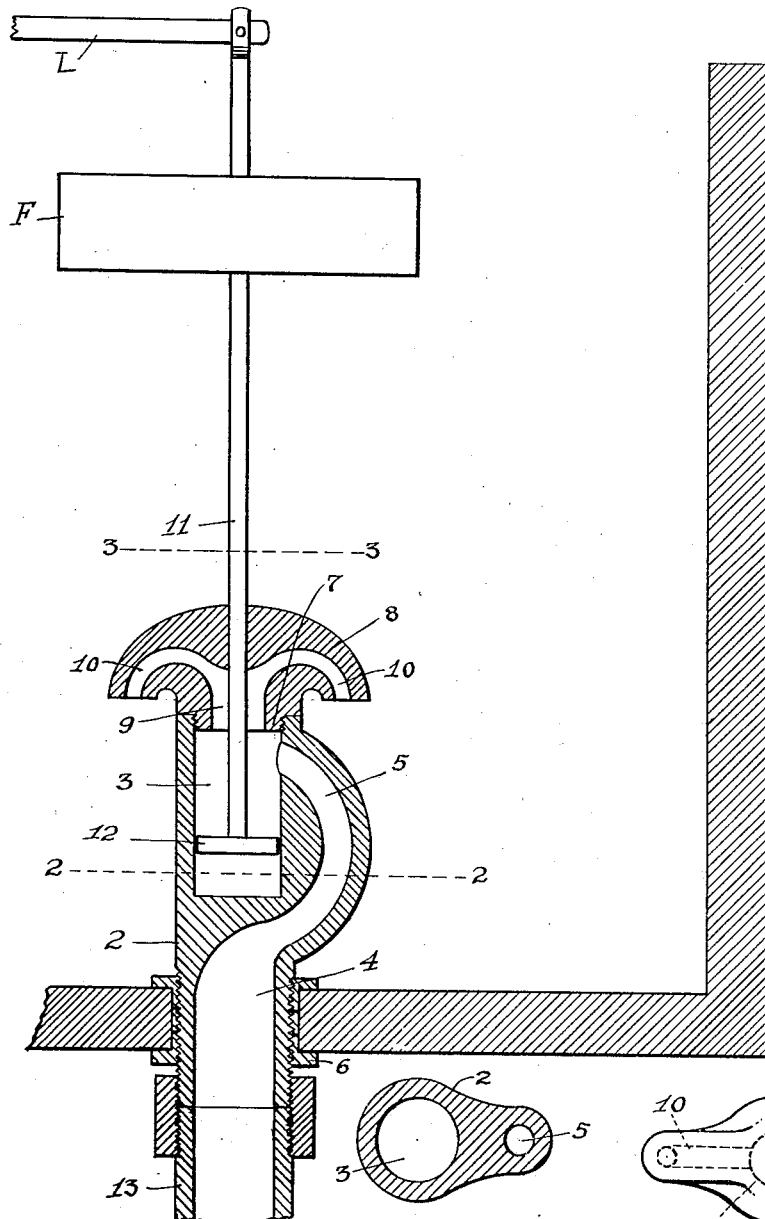
Figure 1 is a section through a portion of a tank having the present improvements applied thereto.
Figure 2:
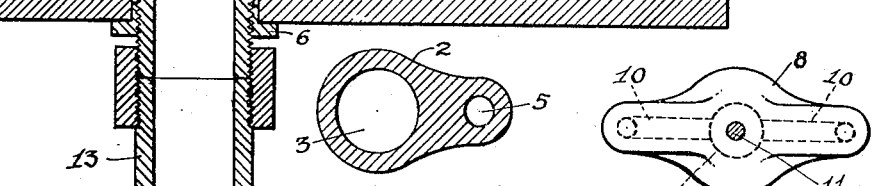
Fig. 2 is a section on line 2—2, Fig. 1.
Figure 3:
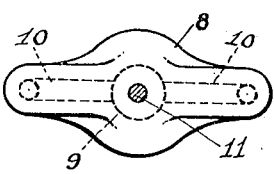
Fig. 3 is a section on line 3—3, Fig. 1.

Referring to the figures by characters of reference, 1 designates a portion of a flush tank which may be provided with the usual flush valve, etc., not shown. The present invention resides in the supply valve which includes a casing 2 having upper and lower non-communicating bores 3 and 4 which are in alinement and the upper ends of which are connected by a by-pass 5. The lower portion of the casing is adapted to extend through the bottom of the tank 1 and to be held thereto by suitably arranged nuts 6, while the upper end of the casing is provided with interior screw threads for engagement with the reduced threaded end 7 of a large wing nut 8. In this wing nut is formed a central bore 9 provided with outlet passages 10 extending therefrom and within the wings of the nut, the said passages opening downwardly through the ends of the wings, as shown.

A stem 11 is slidably mounted within the wing nut and extends along the center of the bore 3, the upper end of the stem being connected to a float F. A lever L such as usually employed for connecting a supply valve to a flush valve may be attached to the stem as shown. A piston is secured to the lower end of the stem 11, as shown at 12 and is loosely mounted in the bore 3, this piston being movable upwardly against the reduced end of the wing nut to constitute a valve, thereby to close communication between the by-pass 5 and the passages 10.

It will be understood that when water is discharged from the tank, the piston or valve 12 will be situated in the bottom portion of the bore 3 and water will therefore be free to flow from a supply pipe 13 into the bore 4 and thence through by-pass 5 into the upper portion of the bore 3 to the passages 10 and thence into the tank. As the level of the water rises the float will gradually raise the valve until it is brought to position where the pressure of water under it will press it to its seat on the lower end of the wing nut, whereby the supply will be cut off promptly.

Importance is attached to the fact that the outlet end of the valve casing is in the form of a wing nut because it is thereby possible to remove the end of the casing and take out the valve, merely by reaching into the tank and working at the wing nut with the bare hand and without the use of any tool. In many instances the tanks are so situated and the interior mechanism is of such construction that it is a very difficult matter to repair the valve by reaching into the tank with a tool and it often becomes necessary to bodily remove parts which adds materially to the cost of the repairs. The present invention obviates this objection.

What is claimed is:—

1. A supply valve including a casing having non-communicating alining bores extending thereinto from opposite ends respectively, a by-pass connecting the upper end of the lower bore with the upper end portion of the upper bore, a valve mounted for sliding movement within the upper bore and to position either entirely above or entirely below the point of communication between the upper bore and the by-pass, a wing nut closing the upper end of the upper bore and having a passage therethrough discharging downwardly from one of the wings, and a valve stem slidable within the wing nut, said nut constituting a seat for the valve when the valve is in its raised position.

2. A supply valve including a vertically disposed casing having upper and lower alining bores, a by-pass extending from the upper end of the lower bore and opening into the upper bore at a point near the upper end thereof, a piston slidable within the upper bore and movable to position either entirely above or entirely below the point of communication between the by-pass and the upper bore, a wing nut closing the upper end of the upper bore and constituting a seat for the valve, and passages extending through the wing nut and discharging downwardly from the wings, said nut constituting a bearing for the stem of the valve.

In testimony that I claim the foregoing as my own, I have hereto affixed my signature in the presence of two witnesses.

JOHN L. FOISTER.

Witnesses:
S. W. BYNUM,
D. S. LONG.